W. GUTENKUNST.
DIVISION MEMBER FOR STANCHIONS.
APPLICATION FILED MAR. 15, 1916.
1,204,862.
Patented Nov. 14, 1916.
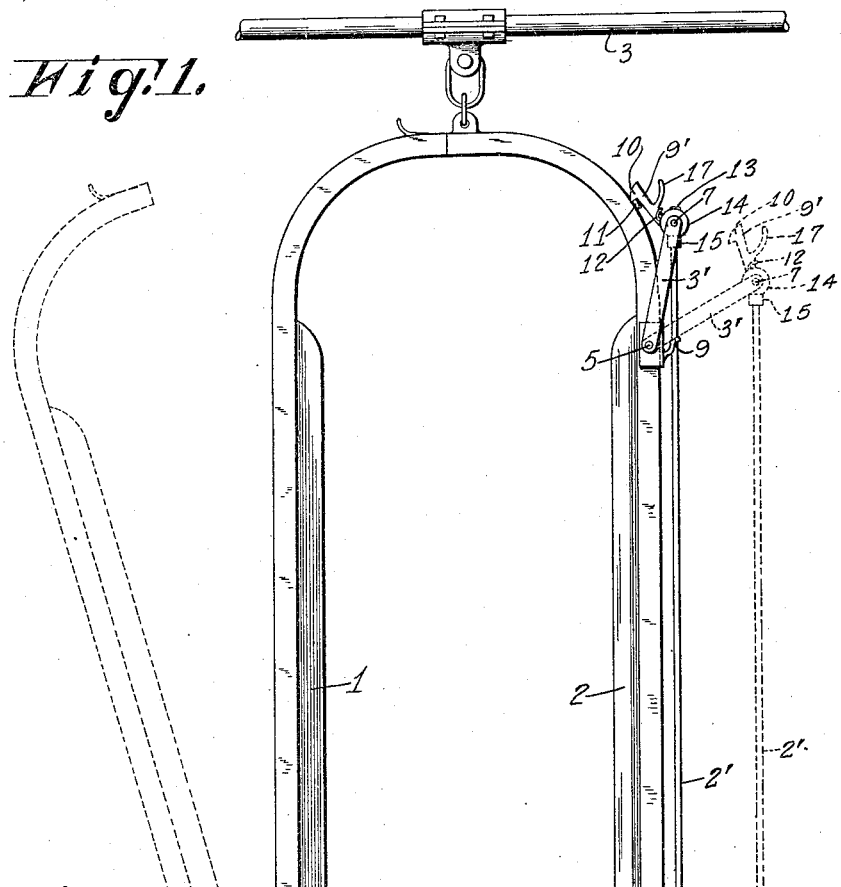
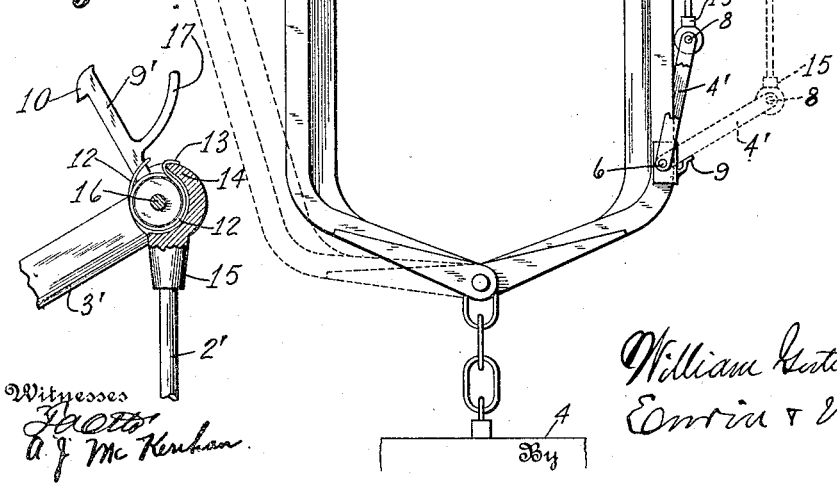

UNITED STATES PATENT OFFICE.

WILLIAM GUTENKUNST, OF MILWAUKEE, WISCONSIN.

DIVISION MEMBER FOR STANCHIONS.

1,204,862.  Specification of Letters Patent.  Patented Nov. 14, 1916.

Application filed March 15, 1916. Serial No. 84,278.

*To all whom it may concern:*

Be it known that I, WILLIAM GUTENKUNST, a citizen of the United States, residing at the city of Milwaukee, county of Milwaukee, and State of Wisconsin, have invented new and useful Improvements in Division Members for Stanchions, of which the following is a specification.

The object of my invention is, first, to provide a simple and efficient device for temporarily closing the space between or at the side of a pair of stanchions, whereby cattle or other animals are prevented from inserting their heads or from passing through such space, whereby cattle are more easily caused to insert their heads between the ordinary bars of a pair of stanchions. Second, to provide means for readily removing such device and retaining it out of the way as soon as the cattle or other animals have been secured in place between the bars of a pair of stanchions in the ordinary way.

My invention is further explained by reference to the accompanying drawing, in which—

Figure 1 represents a front view of an ordinary pair of stanchions provided with one of my improved devices for preventing an animal from entering the otherwise open space between such stanchion and between such stanchion and the next adjacent pair of stanchions, also for closing a similar space between a pair of stanchions and any other stationary object, and Fig. 2 is a detail showing a device for connecting the upper end of my device with and locking the same in engagement with one of a pair of stanchions.

Like parts are referred to by the same reference numerals in both views.

1 and 2 represent two parallel bars of an ordinary pair of stanchions connected at their respective upper and lower ends to the horizontally arranged bars 3 and 4, in the ordinary manner.

It will be understood that as ordinarily made there is an open space between each of the several stanchions of a series and sometimes at one or both ends of a series of stanchions, through which space cattle are liable to insert their heads and in some instances the animal will pass through such space.

By my improvement I have provided a vertical swinging bar 2' at one side of each pair of stanchions, which bar, when thrown out to the position indicated by dotted lines in Fig. 1, closes the space between such stanchion or between one pair of stanchions and any stationary object.

The bar 2' is pivotally connected at its respective upper and lower ends with a pair of stanchions by the inclinable links 3' and 4', and said links are respectively connected at one end to said pair of stanchions by the pivotal bolts 5 and 6 and at their opposite ends to said bar 2' by pivotal bolts 7 and 8. 9 is a stop upon which said links 3' and 4' rest as said links 3 and 4 and bar 2' are thrown to the position indicated by dotted lines. To the end of said bar 2' and link 3' is connected a dog 9' which dog is provided with a catch 10, which catch is adapted as said links 3' and 4' and bar 2' are raised to engage the stop 11, whereby said bar 2' is retained in close proximity at one side of one of said pair of stanchions, as shown in Fig. 1, when cattle are retained in place by said stanchion. When, however, cattle are being put in place between the several pair of stanchions, said bar 2' is dropped from the position shown to that indicated by dotted lines in said figure, whereby cattle are prevented from surreptitiously passing said stanchion. The dog 9' is held in yielding contact with said stanchion and said catch 10 is prevented from becoming accidentally disengaged from the stop 11 by a spring 12. One end of said spring 12 is provided with a hook 13 which is adapted to engage a stationary lug 14, which lug 14 is formed integral with or connected to the sleeve 15, and said lug and sleeve are connected with the upper end of said bar 2'. The opposite end of said spring 12 is connected through the pivotal bolts 16 with said dog 9', whereby said dog is retained in yielding contact, as stated, with said stop 11. The dog 9' is provided with an arm or handle 17 by which it is thrown into and out of engagement with said stop 11 at the will of the operator.

Having thus described my invention, what I claim as new and desire to secure by Letters Patent, is:—

1. In a device of the described class, the combination with the stationary member of a pair of stanchions, of a vertical swinging bar, a pair of swinging links, one located at each end of said bar, a pair of pivotal bolts for connecting the free or outer end of said links with said swinging bar, a pair of bolts connecting the inner end of said links with said stanchion, a dog pivotally connected with the upper end of the upper link of said stationary member, and means for connecting the free end of said dog with one side of said stationary member.

2. In a device of the described class, the combination of the stationary member of a pair of stanchions, a vertical bar, means for pivotally connecting said bar with one side of said stationary member, means for supporting said bar at a distance from the side of said stanchions, a dog pivotally connected with the upper end of said bar, a catch formed on the free end of said dog, a lug formed upon one side of said stationary member, a spring for retaining said catch in engagement with said lug, whereby said bar is retained in close proximity to one side of said stanchions.

3. In a device of the described class, the combination of a pair of stanchions, a vertical swinging bar, a pair of links, one located at each end of said bar, a pivotal bolt connecting one end of each of said links with said bar, a pivotal bolt connecting the opposite end of each of said links with said stanchions, a dog pivotally connected with the free end of one of said links and the upper end of said bar, a catch formed on the free end of said dog, a lug formed upon one side of said stanchions, a spring connected with the upper end of said bar and the upper link of said pair, a handle formed integral with said dog, whereby said dog is brought into and out of engagement with said lug, and a stop for supporting said bar and links, all substantially as and for the purpose specified.

In testimony whereof I affix my signature in the presence of two witnesses.

WILLIAM GUTENKUNST.

Witnesses:
JAS. B. ERWIN,
IRMA D. BREMER.

Copies of this patent may be obtained for five cents each, by addressing the "Commissioner of Patents, Washington, D. C."